US010820396B2

(12) United States Patent
Barna et al.

(10) Patent No.: US 10,820,396 B2
(45) Date of Patent: Oct. 27, 2020

(54) ILLUMINATION CONTROL SYSTEMS AND METHODS

(71) Applicant: RAB Lighting Inc., Northvale, NJ (US)

(72) Inventors: Ross A. Barna, Northvale, NJ (US); Jason Lawrence Oliver, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 16/402,385

(22) Filed: May 3, 2019

(65) Prior Publication Data

US 2019/0342982 A1 Nov. 7, 2019

Related U.S. Application Data

(60) Provisional application No. 62/666,410, filed on May 3, 2018.

(51) Int. Cl.
*H05B 47/19* (2020.01)
*H04W 4/021* (2018.01)
(Continued)

(52) U.S. Cl.
CPC .............. *H05B 47/19* (2020.01); *G01S 19/14* (2013.01); *H04W 4/021* (2013.01); *H05B 45/20* (2020.01); *H05B 47/105* (2020.01); *H05B 47/11* (2020.01)

(58) Field of Classification Search
CPC ............ H05B 37/0272; H05B 37/0218; H05B 37/0227; H05B 33/0872; G01S 19/14; G04W 4/021; G04W 4/02; G04W 4/06
See application file for complete search history.

(56) References Cited

U.S. PATENT DOCUMENTS 5,905,442 A * 5/1999 Mosebrook ........ G05B 19/0423
9,220,202 B2 12/2015 Maxik et al.
(Continued)

OTHER PUBLICATIONS

Mika Raatikainen, Robert Ciszek, Johanna Narvainen, Juho Merilahti, Sami Siikanen, Timo Ollikainen, Ilona Hallikainen, Jukka-Pekka Skon; System Architecture of Customized Intelligent Lighting Control and Indoor Environment Monitoring System for Persons with Mild Cognitive Impairment or Dementia; published Sep. 14-16, 2016; retrieved from <http://ieeexplore.ieee.org/abstract/document/7749463/>.

(Continued)

*Primary Examiner* — Raymond R Chai
(74) *Attorney, Agent, or Firm* — Frost Brown Todd LLC; Dennis S. Schell; Kevin C. Oschman (57) ABSTRACT

Illumination control systems and methods, including those for influencing circadian rhythm, are disclosed. Embodiments include a control device capable of obtaining desired color temperature (e.g., local daylight) information, generating a color temperature value, and outputting a signal including the color temperature value. Embodiments further include a server having means for obtaining at least one of geographical location information and time of day information relative to the server, a processor to determine local daylight information, and a wireless transmitter to broadcast the signal within a site system. Embodiments further include one or more lighting control devices to control lighting devices, each lighting control having a wireless receiver to continuously listen for and receive the signal broadcasted by the server, and a lighting driver to change the lighting output of the coupled lighting device according to the detected signal.

20 Claims, 3 Drawing Sheets

(51) Int. Cl.
*G01S 19/14* (2010.01)
*H05B 45/20* (2020.01)
*H05B 47/11* (2020.01)
*H05B 47/105* (2020.01)

(56) References Cited

U.S. PATENT DOCUMENTS

| | | | |
|---|---|---|---|
| 9,636,520 B2 | 5/2017 | Pedersen | |
| 2012/0319819 A1* | 12/2012 | Tkachenko | G01S 13/878 340/10.1 |
| 2013/0076491 A1* | 3/2013 | Brandsma | H04W 52/0229 340/10.3 |
| 2016/0073483 A1* | 3/2016 | Setomoto | H05B 47/19 315/313 |
| 2016/0212694 A1* | 7/2016 | Lindoff | H04W 48/16 |
| 2017/0105265 A1 | 4/2017 | Sadwick | |
| 2017/0189640 A1 | 7/2017 | Sadwick | |
| 2017/0238401 A1 | 8/2017 | Sadwick et al. | |
| 2017/0245354 A1 | 8/2017 | Yadav et al. | |
| 2018/0153024 A1* | 5/2018 | Hadachi | H05B 47/105 |
| 2019/0297704 A1* | 9/2019 | van de Ven | F21V 5/04 |

OTHER PUBLICATIONS

Ali Motamed, Marta Benedetti, Jean-Louis Scartezzini; On the Impact of Integration of Non-Image Forming (NIF) Effect of Light on Electrical Lighting Control in Non-Residential Buildings; published in 2016; retrieved from <http://www.iaqvec2016.org/download/Files/1231.pdf>.

Dr. Mark Rea, Aaron Smith, Andrew Bierman, Dr. Mariana Figueiro; The Potential of Outdoor Lighting for Stimulating the Human Circadian System; published on Apr. 9, 2014; retrieved from <http://www.ee.co.za/article/potential-outdoor-lighting-stimulating-human-circadian-system.html>.

* cited by examiner

ILLUMINATION CONTROL SYSTEMS AND METHODS

PRIORITY

This application claims the benefit of U.S. Provisional Application No. 62/666,410, filed May 3, 2018, and titled "Illumination Control Systems and Methods," the entirety of which is hereby incorporated herein by reference.

TECHNICAL FIELD

Embodiments of this disclosure relate generally to control systems and more particularly to wireless lighting control systems for adjusting the color temperature output of a plurality of lighting devices.

BACKGROUND

Circadian rhythms are physical, mental, and behavioral changes in humans, plants, and animals that follow a roughly 24-hour cycle, responding primarily to light and darkness in the environment. Circadian rhythms can influence sleep-wake cycles, hormone release, body temperature and other important bodily functions. Research exists indicating that humans perform better and are healthier when indoor lighting is color-corrected, sometimes referred to as "color tuning," or, more specifically, "white tuning," to represent the actual outdoor color as provided by the sun for the specific time of day (e.g., blue color in the morning, red/orange as the day transitions to afternoon, white at the brightest point in the day, and reversing this pattern into the night).

SUMMARY

To accomplish these desired lighting effects within an indoor environment, all indoor lighting devices would need to continually adjust and synchronize with one another throughout the day and night. This should hold true even when individual lighting devices are periodically powered on/off. Existing lighting devices achieve this by including atomic clocks and color-correction capabilities onboard each individual lighting fixture to ensure all fixtures color-correct immediately upon being turned on.

However, incorporating such technology into each lighting fixture can become expensive and cost-prohibitive for users commissioning a large number of lighting devices. It was realized by the inventors of the current disclosure that improvement in the existing circadian rhythm lighting adjustment technology is needed to allow continual, large-scale color temperature adjustments throughout the day. Further, it is important to do so in a low-cost manner. Embodiments of the present disclosure provide an improved illumination control system and method of using the same.

In accordance with one embodiment of the present disclosure, a wireless lighting control system can direct the lighting output of one or more lighting devices to affect a biological circadian rhythm. The system can include a server having a means for obtaining operational information including at least one of geographical location information and time of day information relative to the server, a processor configured to determine local daylight information using the operational information and to generate a signal including a color temperature value representative of the local daylight information, and a wireless transmitter configured to broadcast the signal within a site system.

In accordance with another embodiment of the present disclosure, a wireless lighting control system can include one or more lighting control devices which can be positioned within the site system, and each of the one or more lighting control devices can be configured to couple to a lighting device and to control a lighting output of the lighting device. Further, each of the one or more lighting control devices can include a wireless receiver configured to continuously listen for and receive the signal broadcasted by the server, and a lighting driver coupled to the wireless receiver and operable to change the lighting output of the coupled lighting device according to the detected signal.

The illumination control system of the present disclosure can include additional features for obtaining operational information (i.e. local daylight information, or local time and geographical location information) of the control device. In a first embodiment, the control device can use a GPS module for obtaining operational information. In a second embodiment, the control device can use a cellular transceiver for obtaining the operational information. In a third embodiment, the control device can use an internet-enabled device to obtain the operational information. In a fourth embodiment, the control device can receive the operational information from a geographically remote server. In a fifth embodiment, the control device can receive the operational information from one or more local daylight sensors. In a sixth embodiment, the control device can accept input from a user via a local or remote user interface.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, wavelengths, frequencies, dimensionless parameters, etc.) may be used explicitly or implicitly herein, such specific quantities are presented as examples only and are approximate values unless otherwise indicated.

The embodiments of the present disclosure provide devices and methods which enable color temperature adjustments to be made to a plurality of lighting devices, the color temperature adjustments of which can be used to regulate a biological (circadian) rhythm.

Figure 1:
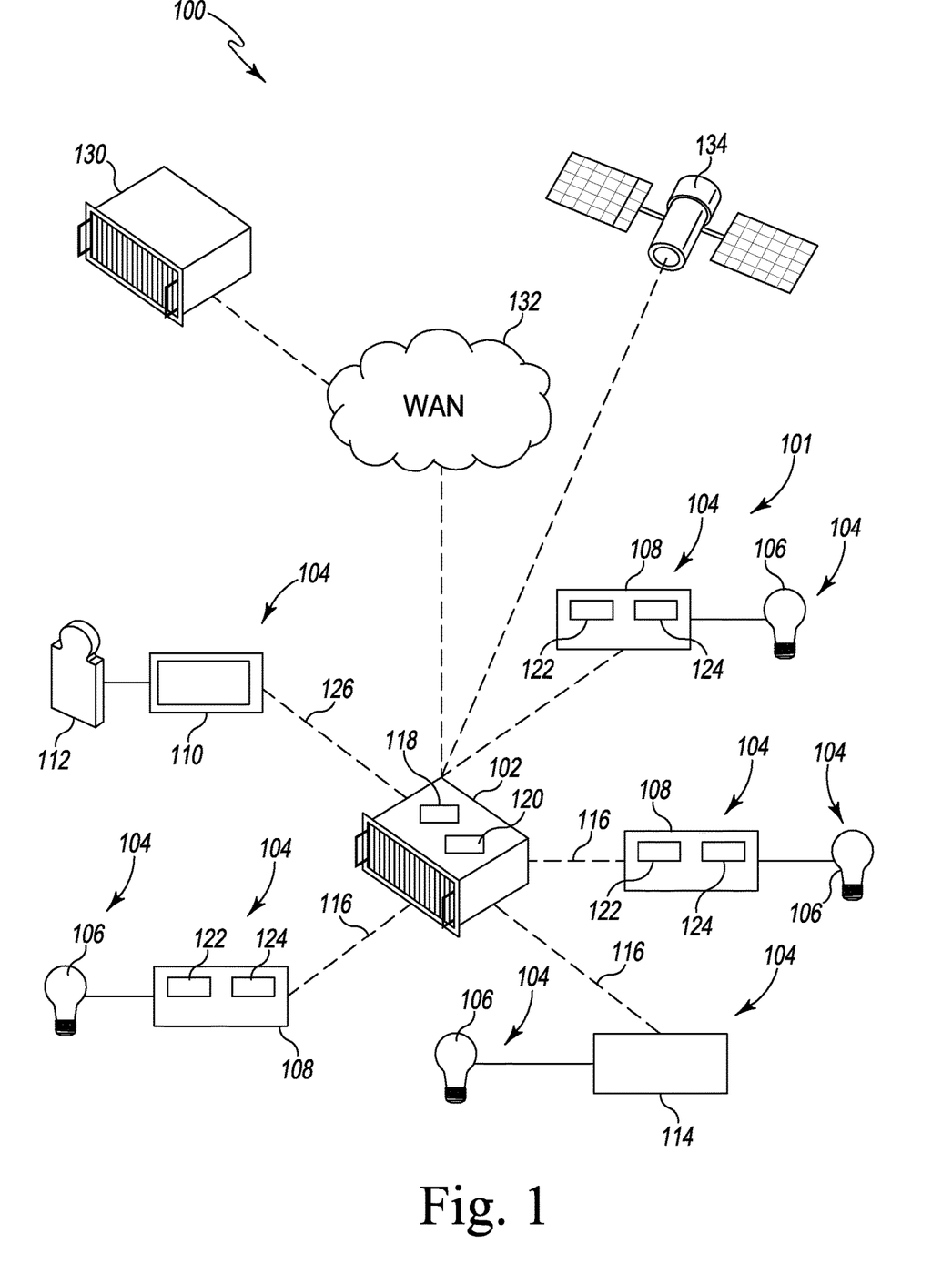
FIG. 1 illustrates a schematic block diagram of an exemplary illumination control system, according to the present disclosure.

Depicted in FIG. 1 is an illumination control system 100 according to at least one embodiment of the present disclosure. The exemplary illumination control system 100 includes a local server 102 in connection with one or more site devices 104 located at a site system 101. Site devices 104 can include lighting devices 106 such as, for example, light emitting diode (LED) lamps, and lighting controllers 108 including, for example, an LED driver, associated with the lighting devices 106. As described herein, the local illumination control server 102 communicates lighting output adjustments to lighting controllers 108, wherein each lighting device 106 is coupled to and operated by a lighting controller 108. However, it should be understood that lighting controllers 108 may, in some embodiments, be integrated with one or more lighting devices 106.

Site devices 104 can also include various additional wired or wireless devices such as a user interface device 110 for a user 112 to connect to the local server 102, a daylight harvester 114 to provide ambient light sensor input to one or more lighting controllers 108 or the local server 102, or other known lighting and lighting-controlled devices such as occupancy sensors, touchscreens, and wall dimmers. The local server 102 communicates to site devices 104 via a wireless communication signal 116 of wireless communication link or network, for example, broad spectrum radio, Zigbee, microwave radio, WiFi, Bluetooth, or any other suitable local wireless communication means. In one exemplary embodiment, the wireless communication link is dedicated to be used only by a local server 102 to broadcast lighting control signals to the site devices 104 for affecting the color-temperature and/or dimming lighting output changes described herein. In an alternative embodiment, the wireless communication link is designated to be used similar to the local wireless network as used by the LIGHTCLOUD lighting control system available from RAB Lighting Inc., of Northvale, N.J., wherein a local server 102, a local gateway, and/or one or more site devices 104 utilize the network to transmit additional data throughout the local site 101 to and from the local server 102 and/or gateway such as, for example, lighting status indicators, power loss indicating signals, lighting scenes, etc.

The local server 102 facilitates wireless broadcasts of color temperature adjustment signals to one or more lighting devices 106, wherein the color temperature values can be calculated to mimic the color temperatures as provided by the sun in the local outdoor environment. In at least one embodiment, the one or more lighting controllers 108 within wireless communications range of the local server 102 can actively listen for, detect, and receive the broadcasted wireless communication signals 116 on a continuous or near-continuous basis, as is explained below, and adjust its lighting color temperature output according to the color temperature level provided by the broadcast signal 116. As such, the connected lighting devices 106 can output varying lighting effects or lighting patterns (for example, varying color-temperature effects, color-temperature schedules or patterns, and/or dimming effects) which remain in sync throughout the day, despite whether any individual lighting device is toggled on/off or the dim level is modified by a user.

In one embodiment the local server 102 broadcasts at a rate of about once per second, while refreshing the color-temperature broadcast signal 116 on a periodic basis which, in some examples, may be at the same rate as the local server 102 broadcasts or at faster or slower intervals. In an alternative embodiment the local server 102 broadcasts at a rate of about ten times per second. The lighting controllers 108 listen for broadcasted signals 116 on a periodic basis which may also mimic the rate of the local server 102, or at intervals which are faster or slower than the rate of the broadcasts. In one embodiment, lighting controllers 108 listen for broadcasted signals once every second. In an alternative embodiment, lighting controllers 108 listen for broadcasted signals ten times per second. As such, the system 100 is continuously revising the color-temperature output values such that the synchronized lighting patterns modify throughout the day wherein transitions between each lighting output affecting the pattern is imperceptible by the human eye.

To determine which color temperature to broadcast, the local server 102 can correlate operational information, that is, time and location data, with a schedule-to-color temperature conversion chart to calculate the appropriate color temperature of the sun. In alternative embodiments, the local server 102 can derive the appropriate color temperature using formulaic calculations, lookup tables, or through referencing internet sources. Site devices 104 in the system 100 then broadcasts a signal 116 containing a color-temperature value, or a data reference point for local lookup at the lighting controller 108 (for example, if the lighting controller 108 locally stored a reference data to color-temperature lookup table) to any and all lighting devices 106 which are within communication range and enabled to listen for and receive the broadcasted signal 116. Lighting devices within range can receive the broadcasted values and change their color temperatures to the received value.

Typically, outdoor atmospheric or ambient lighting conditions (i.e., color-temperatures) can be expressed as a unit of Kelvin. The kelvin range for ambient color-temperatures is about 1000K to 12000K, with the most common range for color-temperature lighting corrections being between about 2000K and 10000K, which generally correlates to ambient conditions as shown in Table 1 below:

TABLE 1

Example Color-Temperature and Ambient Condition Correlations

| Ambient Conditions | Approx. Color Temperature (Kelvin) |
| --- | --- |
| Clear Sky | 10000 K |
| Shade, Clear Day | 8000 K |
| Cloudy Sky | 6500 K |
| Noon Sunlight | 5300 K |
| Two Hours After Sunrise | 4500 K |
| One Hour After Sunrise | 3500 K |
| Sunrise/Sunset | 2000 K |

It should be appreciated, however, that any number of variable color-temperature steps may be interpolated from this data set. For example, the correlation data of server 102 may have a range of about 2000K-12000K but may include a multitude of intermediate steps within that range, for example, 2000K, 2005K, 2010K, . . . , 11090K, 11095K, 12000K. As such, the system 100 is capable of continuously updating the broadcasted signal 116 based upon the operational information of the server 102 to ensure the color-temperatures of all lighting devices 106 remain in sync and transitioning between color-temperature levels which appear natural and imperceptible by a human eye. In some embodiments, the lighting controller 108 adjusts lighting control based upon the capabilities and restrictions of the particular coupled lighting device 106. For instance, if a particular lighting device 106 is only capable to output color-temperatures between a smaller kelvin range than is being broadcast by the local server 102, the lighting controller 108 will recognize this and adjust the output driving signal sent to the lighting device 106.

Further, each lighting device can actively listen for a broadcasted signal 116 from the server immediately upon powering on, for example, as part of its start-up routine, and adjust its color-temperature output either before first illuminating, soon thereafter, or otherwise at an interval in which the color-temperature change or illumination output delay would be imperceptible by a human eye. Active listening includes enabling a radio module and permitting a receiver 122 to continuously listen for signals 116 broadcast over one or more frequencies. By doing so, this allows virtually any amount of lighting devices 106 to remain at the same color-temperature level throughout the day even if toggled on and off periodically, provided the lighting devices are within communication range of the broadcasted signal 116. In an exemplary embodiment, the receiver 122 continuously listens on one particular designated or previously-utilized frequency set by a user or by the local server 102. In alternative embodiments, the receiver 122 continuously listens across a particular range of frequencies or continuously listens using a frequency-hopping technique.

In some embodiments, the local server 102 also correlates the operational information with local daylight information to generate dim level (e.g., brightness) data to send via the broadcasted signal 116. The dim level data may correlate with the time of day (morning, afternoon, nighttime, or any period in between) to mimic the brightness of the local outdoor environment, or the dim level data may be controlled or modified by user input. In addition to ambient color-temperatures, brightness is also a factor in the circadian rhythm or response of humans, plants, and/or animals.

The illumination control system 100 may additionally include a user interface device 110 including, for example, a touchscreen control device, such as a smartphone or tablet computing device, having a user interface application or software installed directly thereon, interfacing with the local server 102 for configuring, monitoring and/or controlling the illumination control system 100. The user interface device 110 can connect to the local server 102 through a local wireless connection 126, e.g., WiFi, and can be used to set or adjust the operational information, adjust the color-temperature timing and/or broadcasting schedule, to develop or program a particular lighting pattern, or to directly control the color temperature values or brightness levels (e.g., dimming, ON/OFF, etc.) to broadcast via the communication signal 116.

Another exemplary site device 104 is a daylight harvester 114. The system 100 can optionally be configured to dim or switch lighting devices 106 in response to environmental light level as measured by the daylight harvester 114. More specifically, the daylight harvester 114 can be operated using open-loop control and it reacts to different sunlight levels, e.g., in a first mode the lights are illuminated and extinguished when the light sensor detects ambient light above/below a predetermined level. In another open-loop control mode, multiple thresholds are set and the lights are illuminated, dimmed, and extinguished depending on the ambient light sensed relative to the various thresholds. The daylight harvester 114 can also be used to detect environmental color temperature levels in real-time and communicate the levels to the local server 102 such that the local server 102 may use the daylight harvester 114 data in place of the operational information. For example, if operational information is not known, the daylight harvester 114 can be employed to detect and transmit the real-time color temperature values to the local server 102 for the local server 102 to process and broadcast via wireless communication 116 to the site devices 104 as per the normal operating procedure.

In some embodiments, the local server 102 includes additional functionality similar to other lighting control servers or may be, for example, a LIGHTCLOUD lighting control gateway made by RAB Lighting Inc. with added features for color-temperature adjustment. The remote server 130 may be remote from the site devices 104 and the local server 102. For example, Digi® Device Cloud, offered by Digi® International, Inc., is a public cloud platform for device network management that may be used for all or portions of the remote server 130. The remote server 130 may communicate with the local server 102 and the site devices 104 over a wide area network (WAN) 132, such as the internet or a cellular network, via a local area network (LAN), or via satellite 134. Cellular communication may be quicker to set-up, more secure and/or more reliable than other available communications means, such as an installation site's broadband internet connection. By using a cellular network, embodiments of the present disclosure are able to keep out of the organization's corporate network, which can assist in mitigating accidental creation of back doors through firewalls and into the user's corporate network that could potentially be used to create a security breach in the organization's corporate network.

Figure 2:
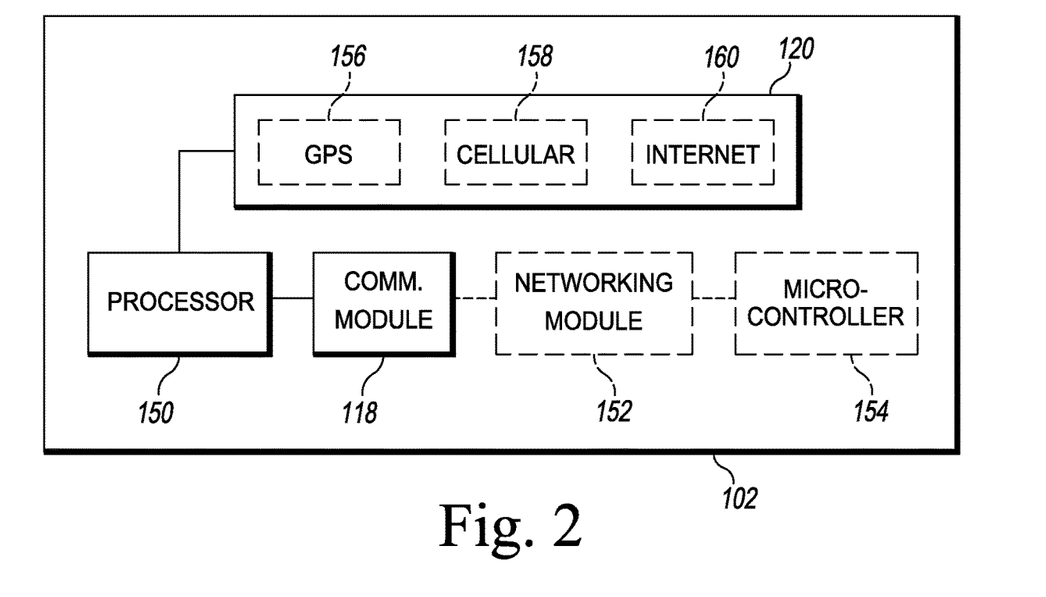
FIG. 2 illustrates a block diagram of an exemplary illumination control server, according to the present disclosure.

Depicted in FIG. 2, the local server 102 may include particular computer components, including a processor, memory, storage, display, network interface, and input/output device configured and adapted for one or more of determining local daylight information, accepting user input, and broadcasting color-temperature values. The processor 150, or processors, may execute unique sets of instructions which may be implemented as computer readable program code and stored in memory or storage such that the local server 102 is configured as a special purpose system. In particular, hardware, software, and particular sets of instructions may transform the local server 102, or portions thereof, into a lighting control server, as described herein.

In one embodiment, the local server 102 includes a combination of computer hardware and software which facilitates communication with the site devices 104 of the illumination control system 100 and performance of the functions described herein such as, for example, a communications module 118 to broadcast the wireless communication signal 116, a networking module 152, and/or a microcontroller or processor 154. The communications module 118 can be configured to broadcast the wireless communication signal 116 on a repetitive basis, e.g., about ten times per second.

The communications module 118 of the local server 102 may be any known module which is capable of transmitting data wirelessly, for example, a LoRa Ra-01 433 MHZ Long-Range Wireless Transceiver Module by AI-Thinker or Mini RF Wireless Transmitter Module H34A-433 433 MHz Wireless Module by ICHSTAR. Further, any known and suitable networking modules and microcontrollers may be included in the server such as, for example, an ESP8266 ESP-01 WiFi Wireless Transceiver Module by Addicore or an ATmega328 8-bit AVR RISC-based microcontroller by MicroChip. In some embodiments, the local server 102 does not include wireless receiving capabilities.

The local server 102 further includes an operations module 120 that determines or receives operational information related to an amount and/or quality of light to be emitted from a lighting fixture, e.g., one or more of local daylight conditions, time, time zone, declination of the sun, altitude, date, geographical latitude and geographical longitude of the local server 102, desired daylight conditions (e.g., daylight conditions offset from local daylight conditions, specified light intensities, and/or specified color temperatures), or a desired lighting pattern received from a remote server, the operational information of which can include specified light intensities and/or color temperatures such that the desired light intensity and/or color temperature can be determined. The operations module 120 can include any suitable means for obtaining the operational information of the local server 102 such as by including one or more of a GPS module 156 (for example, a BU-353-S4 GPS receiver from US Globalsat Inc.), a cellular GSM module 158 (for example, a SIM800L GSM module from SIMCom), a WWVB radio controlled clock, an atomic clock, FM radio, a wired or wireless internet connection module 160, a user input module, a connection to a remote server directly or through a local gateway, and/or a direct connection to a local sensor.

Using one method, this calculation can be completed by referencing a default lookup table, database, or conversion chart which is stored onboard the local server 102. The lookup table can include color temperature values corresponding to particular intervals, e.g., every 15 minutes, throughout the day. Further, the lookup table, database, or conversion chart can be dynamic and update its values on a daily or weekly basis to provide better color temperature estimates as the seasons change for the local environment. Using another method, the color temperature calculation can be completed by referencing a lookup table or database which is stored external to the local server 102, e.g., on a remote server accessed through a connection to the internet. Using still another method, the default color temperature reference can be programmed and modified by a user 112 by adjusting controls either located directly on the device or via the user interface device 110.

As also should be appreciated by those skilled in the art, the exemplary illumination control system 100 can include more than one local server 102, wherein each local server 102 may function independently or function as a repeater to extend the broadcast range of another local server 102. Accordingly, each local server 102, in a first example, operates independently with regard to one another and broadcast lighting control signals each to a separate grouping of lighting controllers 108. For instance, each lighting controller 108 may individually store local server 102 pairing data indicative of which local server 102 it previously connected to, therefore all future broadcasts from that particular local server 102 will be received while broadcasts from a different local server 102 will be ignored. In this example, each lighting controller 108 will continue selectively listening to signals 116 from the same local server 102 unless or until the pairing is reset. The lighting controller 108 may include with each broadcasted signal 116 a unique device identifier identifying the local server 102 thereby allowing lighting controllers 108 to correctly pair in the event multiple local servers 102 are broadcasting within range of a lighting controller 108. In an alternative method of selectively listening to signals from a particular local server 102, each local server 102 may broadcast at a different frequency and therefore each lighting controller 108 may be configured to listen for a particular frequency.

To pair a lighting controller 108 to a particular local server 102, the lighting controller 108 is initially powered-on, wherein it listens for broadcasted signals from local servers 102. To ensure the correct local server 102 is "paired" to the lighting controller 108, all other local server 102 broadcasts are interrupted or are powered-down during this process. When a subsequent lighting controller 108 is ready to be initially powered-on for pairing, the intended local server 102 for pairing is solely powered-on and broadcasting while all other local servers 102 are not broadcasting. Once paired with a local server 102, the lighting controller 108 stores data indicative of the pairing and remembers which local server 102 to listen for during operation.

In a second example, multiple local server 102 pair with each other via a wireless network connection, for example, within a mesh network. In this example, each local server 102 operates dependently and therefore only a single local server 102 is required to obtain operational information to share with the other local servers 102.

Figure 3:
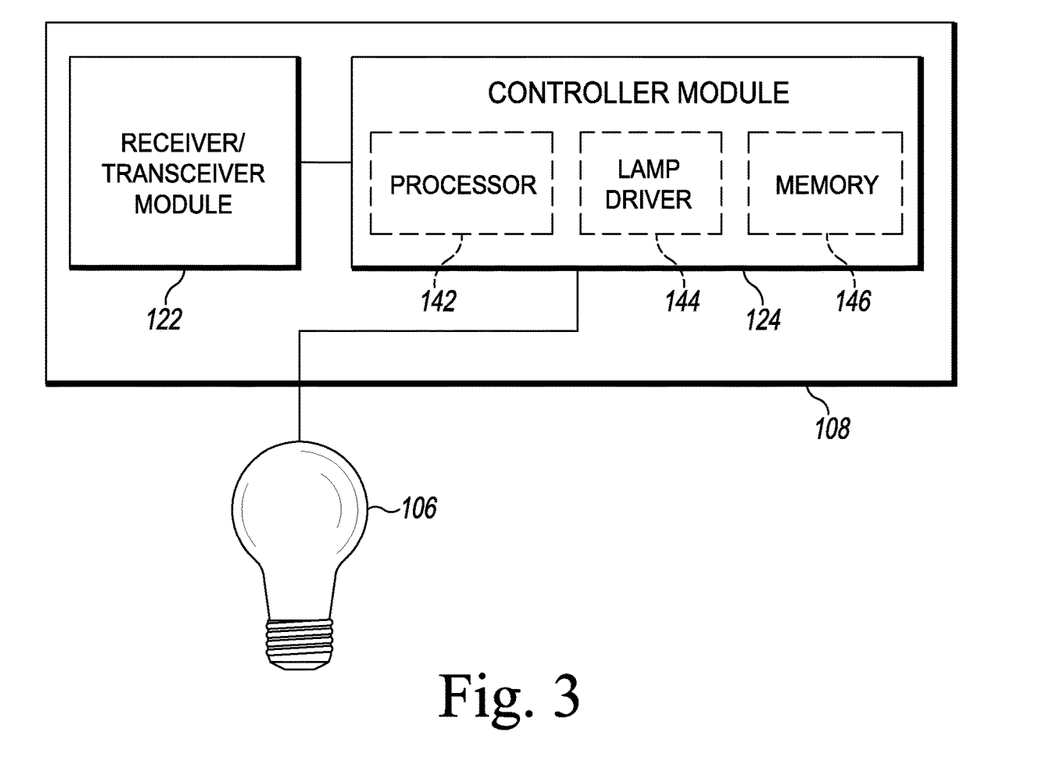
FIG. 3 illustrates a block diagram of an exemplary lighting control device, according to the present disclosure.

Depicted in FIG. 3, an exemplary lighting controller 108 can function as a wireless receiver or transceiver and can provide color temperature adjustment controls to one or more associated lighting devices 106, dimming, and/or ON/OFF control for lighting devices 106 on a common electrical circuit. The color temperature adjustment, dimming, or ON/OFF commands may be received by the wireless communication signal 116 broadcasted from the local server 102. To facilitate communication with the local server 102 and control of the lighting devices 106, a lighting controller 108 can include a receiver module 122, having one of a wireless receiver and/or transceiver, and a controller module 124, having one or more of a processor 142 and a microcontroller, a lighting driver (e.g., an LED driver) 144, and/or a memory module 146. The receiver module 122 can be, for example, a LoRa Ra-01 433 MHZ Long-Range Wireless Transceiver Module by AI-Thinker or an LR45A Receiver Module by ICHSTAR. Further, the controller module 124 can be, for example, an ATmega328 8-bit AVR RISC-based microcontroller by MicroChip. In some embodiments, the lighting controller 108 associated with one or more lighting devices 106 does not include wireless transmitting capabilities.

The exemplary lighting controller 108 may include additional functionality similar to other lighting controllers or may be, for example, a LIGHTCLOUD lighting controller available from RAB Lighting Inc. of Northvale, N.J., which may in some instances include a transceiver and serve as a repeater within a mesh network, and including features for color-temperature adjustment. Lighting controllers 108 may be installed at a junction box, in a breaker box or lighting panel, or integral with a lighting device 106 (e.g. affixed to the lamp or light fixture housing). Further, lighting controllers may form a wired or wireless connection with the lighting devices 106.

An exemplary lighting device 106 may be a simple lamp such as, for example, an LED array or incandescent bulb, or may be a more complex lighting device such as a panel housing an array of LEDs, for example, a WS2812B Intelligent Control LED Integrated Light Source by WorldSemi. The lighting device 106 may house within it all or some of the components of the lighting controller 108 to communicate with the local server 102. The lighting device 106 can be capable of receiving a control signal from the local server 102 or lighting controller 108 which consists of a color temperature value or illumination setting and altering its lighting state according to the control signal. To accomplish an illumination output of varying color temperature values, the exemplary lighting device 106 can consist of one or more tunable LEDs capable of varying their output ratings as measured in degrees of kelvin (K) or can consist of LEDs capable of selectively illuminating in combinations to generate a particular output. Further, one may select an optical component, such as a lens or filter to illuminate at the desired color temperature. Generally, a lower kelvin output means the light appears more yellow while a higher kelvin output means the light appears whiter or bluer. For example, CFLs and LEDs are typically made to match the color of incandescent light bulbs at around 2700-3000 K. Whiter light is typically output at 3500-4100 K while bluer light is output at around 5000-6500 K. The illuminated color temperature of the exemplary embodiment can be selected from known ranges, for example, 2200-6000 K.

Figure 4:
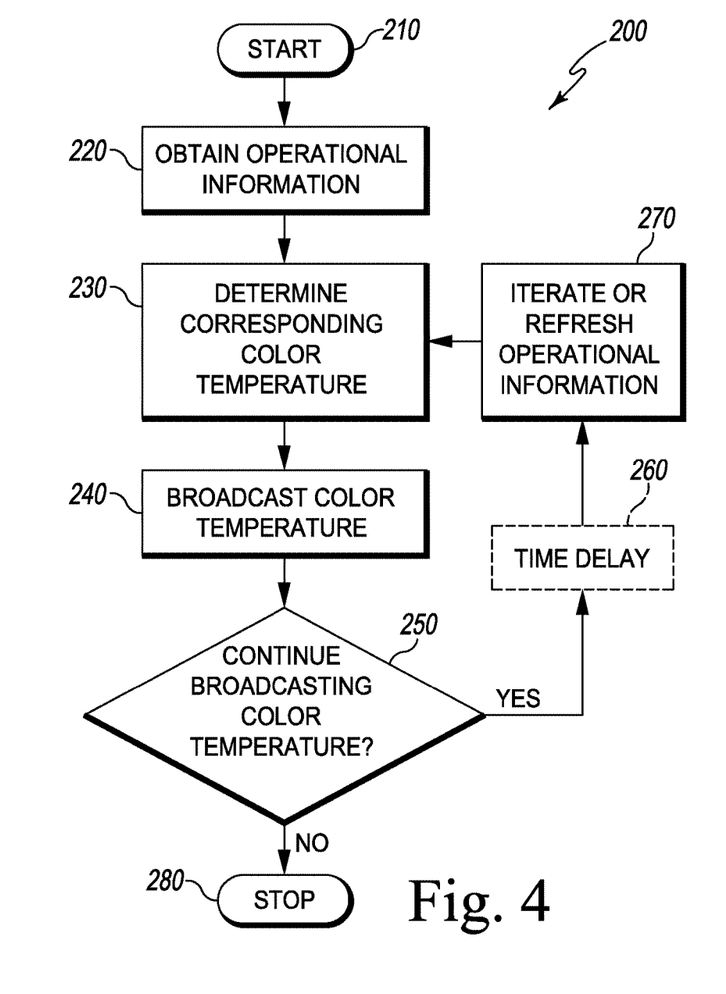
FIG. 4 is a flowchart representing an exemplary method of providing lighting adjustments to one or more site devices of the illumination control system of FIG. 1.

Depicted in FIG. 4 is a flowchart representing an exemplary method 200 of providing lighting adjustment output signals by the local server 102 to one or more site devices 104 of the illumination control system 100. The method begins at a START, Step 210, which generally refers to the powering on of the local server 102 and all of its components and circuitry, and proceeds to a first step, shown at Step 220, in which the local server 102 obtains operational information.

Once the local server 102 obtains the operational information, the local server 102 can then correlate the data at Step 230 with an environmental lighting pattern affecting biological circadian rhythms (e.g. in humans, plants and/or animals). The lighting pattern, for example, may include varying color temperature, hue, and/or brightness levels corresponding to typical daylight illumination changes within the local outdoor environment throughout the 24-hour day cycle.

At Step 240, the local server 102 wirelessly broadcasts communication signals 116, via the communications module 118, containing the desired color temperature value to be output by the lighting devices 106 within communication range of the signals 116. The exemplary communications module 118 can be a low-frequency radio which is capable of broadcasting output signals greater distances with fewer obstructions, although other devices can be used as appreciated by one skilled in the art. Further, a low-frequency radio does not require large bandwidth for normal operation. Site devices 104, such a lighting controllers 108 and lighting devices 106, can be capable of receiving the broadcast signals and changing their lighting outputs accordingly.

At Step 250, the local server 102 will determine whether it should continue broadcasting the current color temperature output values. In one instance, the local server 102 may determine it should not continue broadcasting because the local server 102 has been powered down or a user 112 has directed it to cease and in that case the method proceeds to STOP at Step 280. Otherwise, the local server 102 will generally continue broadcasting and proceed to Step 260.

At Step 260, the local server 102 can optionally apply a time delay to lengthen the amount of time between the broadcasts from the local server 102 to the site devices 104. In an exemplary embodiment, the local server 102 broadcasts communication signals 116 at or near ten times per second, although one can appreciate that this rate can be shortened or lengthened as needed. Therefore, depending on the inherent processing speed and time delays produced by the local server 102 and its associated components, a time delay can be introduced if necessary to slow the rate of the output broadcast signal. The time delay can be chosen at any desired interval preferred by a user. In the exemplary embodiment, a time delay of a particularly short length of time is chosen to ensure lighting controllers 108 first joining the network or listening for broadcasts receive a signal in a quick enough manner such that the connected lighting devices 106 first illuminate or change illuminations at rates of speed imperceptible by the human eye. For example, the chosen time delay can permit the local server 102 to broadcast at a rate of about 10 times per second.

Once the local server 102 is prepared to initiate a new color temperature lookup or conversion to broadcast, the local server 102 at Step 270 can refresh the operational information to ensure the correct output signal is calculated. This can preferably be done using the operations module 120 in the same way as in Step 220; however, if the connection to the operations module 120 has been lost or the data is otherwise unavailable, the local server 102 can simply iterate the time and/or date according to the last known data in conjunction with the known time delays since the last set of data was obtained or iterated. Once an updated set of data has been obtained or calculated, the process can again continue with Step 230 and determine the latest color temperature which corresponds to the operational information.

Figure 5:
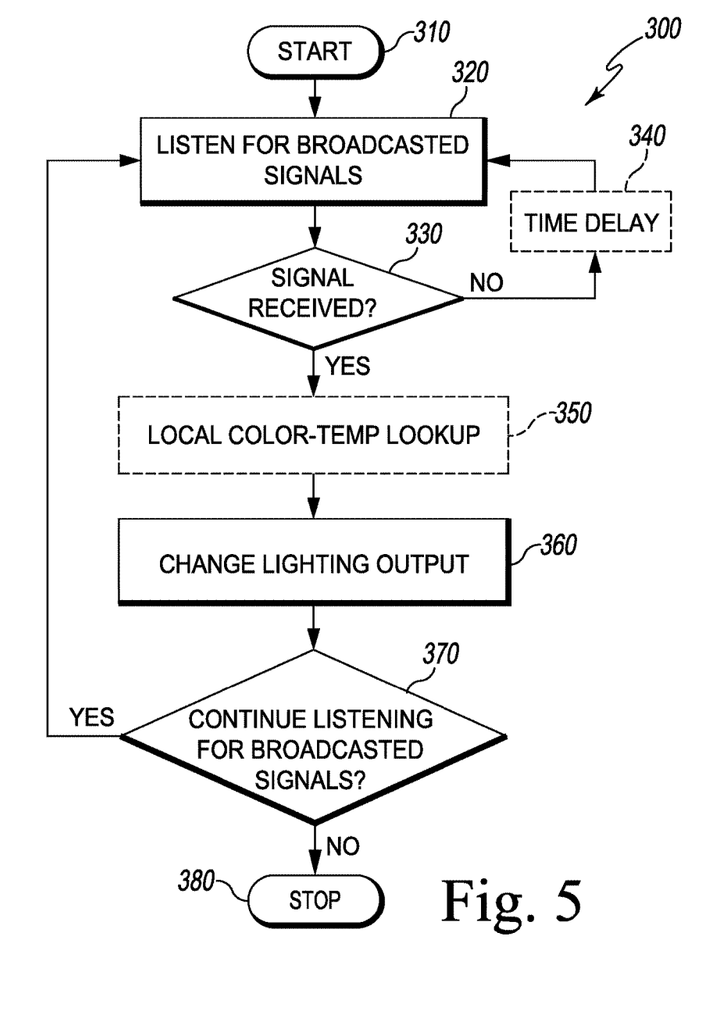
FIG. 5 is a flowchart representing an exemplary method of receiving lighting adjustments by one or more site devices of the illumination control system of FIG. 1.

Depicted in FIG. 5 is a flowchart representing an exemplary method 300 of receiving lighting adjustments by one or more site devices of the illumination control system 100. The method begins at a START, Step 310, which generally refers to the powering on of the local lighting control 108 and all of its components and circuitry, and proceeds to a first step, shown at Step 320, in which the lighting controller 108 listens for broadcasted signals from one or more local servers 102. If a pairing and received signal with a particular local server 102 has already been made in a prior instance, the lighting controller 108 will listen for a broadcast from that particular local server 102. If a pairing with a particular local server 102 has not already been made in a prior instance, the lighting controller 108 will listen for any broadcast from that same local server 102 as before. At Step 330, the lighting controller 108 will determine whether a signal was received as result of the active listening of Step 320. If a signal was not received, the method 300 moves to Step 340 wherein a time delay can optionally be introduced to slow the rate of processing. The time delay can be chosen at any desired interval preferred by a user. In the exemplary embodiment, a time delay of a particularly short length of time is chosen to ensure lighting controllers 108 first joining the network or listening for broadcasts listen for and receive a signal in a quick enough manner such that the connected lighting devices 106 first illuminate or change illuminations at rates of speed imperceptible by the human eye. For example, the chosen time delay can permit the lighting controller 108 to repetitively listen at a rate of about 10 times per second. The rate can be increased or decreases as desired.

If a signal is received at Step 330, the method 300 can optionally move to Step 350 wherein the lighting controller 108 receives a data packet for cross referencing with a locally-stored color-temperature lookup table or to otherwise input into a locally-stored formula to determine a color-temperature output value. In the exemplary embodiment, this step is performed at the local server 102 and the color-temperature is broadcast to lighting controllers 108. Therefore, in the exemplary embodiment, the method 300 moves from Step 330 to Step 360 wherein the lighting controller 108 processes the received signal and directs a change in the output of the connected lighting device 106 according to the received signal. At Step 370, the lighting controller 108 will in most cases return to Step 320 to continue listening for broadcasted signals for further updates to the lighting output. Otherwise, such as if the lighting controller 108 is powered-down or interrupted, the method will end at Step 380.

In at least one embodiment of the disclosure, site devices 104 (e.g. lighting controllers 108 and/or lighting devices 106) listen for the broadcasted communication signal 116 and adjust light output to synchronize with the color temperature value provided by the communication signal 116, and therefore one another, throughout the day. Listening can consist of enabling a radio module and permitting a receiver to listen for signals broadcast over a particular frequency range, or enabling a particular communications module to listen for compatible signals. Lighting controllers 108 and/or lighting devices 106 also listen for the broadcast immediately upon being powered on (such as during the device's start-up routine), so the lighting devices 106 can be periodically powered off and on without falling out of sync with the group. By doing so, the individual site devices 104 do not require equipment, such as atomic clocks or other commonly used equipment, which obtain or calculate operational information at the site device 104. Further, by continually and actively listening for communication signals 116 and updating lighting output nearly instantaneously, a user is virtually unable to detect any delays or lighting changes as the lighting device 106 powers on. Still further, since the local server 102 can broadcast a one-way low-frequency communication signal 116 in all directions, any number of site devices can listen (i.e., search) for and process the information contained in the signal 116. In the event a broadcasted communication signal 116 is not received by a lighting controller 108 and/or lighting device 106 immediately upon powering on, the lighting controller 108 and/or lighting device 106 can be pre-configured to adjust the light output to a particular color temperature, or alternatively, to the color temperature provided by the most recently received broadcasted communication signal 116 such as the last signal 116 received prior to the lighting controller 108 and/or lighting device 106 powering down.

Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A wireless lighting control system for directing the lighting output of one or more lighting devices to affect a biological circadian rhythm, comprising: a server, including: (i) means for obtaining operational information including at least one of geographical location information and time of day information relative to the server, (ii) a first processor configured to determine local daylight information using the operational information and to generate a signal including a color temperature value representative of the local daylight information, and (iii) a wireless transmitter configured to broadcast the signal within a site system; and one or more lighting control devices positioned within the site system, each of the one or more lighting control devices configured to couple to a lighting device and to control a lighting output of the lighting device, each of the one or more lighting control devices including: (i) a wireless receiver configured to continuously listen for and receive the signal broadcasted by the server, and (ii) a lighting driver coupled to the wireless receiver and operable to change the lighting output of the coupled lighting device according to the detected signal.

Example 2

The wireless lighting control system of Example 1, further comprising a GPS module, wherein the means for obtaining operational information includes activating the GPS module and receiving the operational information from a GPS connection.

Example 3

The wireless lighting control system of any of Examples 1 or 2, further comprising a cellular transceiver, wherein the means for obtaining operational information includes activating the cellular transceiver and receiving the operational information from a cellular connection.

Example 4

The wireless lighting control system of any of Examples 1, 2, or 3, further comprising an internet-enabled device, wherein the means for obtaining operational information includes activating the internet-enabled device and receiving the operational information from an internet connection.

Example 5

The wireless lighting control system of any of Examples 1, 2, 3, or 4, further comprising a geographically remote server in communication with the server through a wide-area network, wherein the means for obtaining operational information includes receiving the operational information from the geographically remote server.

Example 6

The wireless lighting control system of any of Examples 1, 2, 3, 4, or 5, wherein at least one of the one or more lighting control devices listens for the signal broadcast from the server as part of its power-up routine and controls the initial illumination of the lighting output of the coupled lighting device.

Example 7

The wireless lighting control system of Example 6, wherein if the signal from the server is not detected as part of the power-up routine, the one or more lighting control devices outputs the lighting output of the last-received signal prior to powering-down.

Example 8

The wireless lighting control system of any of Examples 1, 2, 3, 4, 5, 6, or 7 wherein the signal includes a dimming control signal for adjusting a dim level of the one or more lighting devices.

Example 9

The wireless lighting control system of any of Examples 1, 2, 3, 4, 5, 6, 7, or 8, wherein the server includes a receiver, wherein at least one of the one or more lighting control devices includes a transmitter, and wherein the at least one of the one or more lighting control devices is configured to provide a return signal to the server.

Example 10

The wireless lighting control system of any of Examples 1, 2, 3, 4, 5, 6, 7, 8, or 9, further comprising: (a) a geographically remote server in communication with the server through a wide-area network, wherein the geographically remote server is remotely accessible and configurable by a user; and (b) a user input device, wherein the user input device is configured to accept input from a user to override the color temperature value of the output signal.

Example 11

The wireless lighting control system of any of Examples 1, 2, 3, 4, 5, 6, 7, 8, 9, or 10, wherein the wireless transmitter wirelessly broadcasts the signal throughout the site system at a rate of about ten times per second.

Example 12

The wireless lighting control system of any of Examples 1, 2, 3, 4, 5, 6, 7, 8, 9, 10, or 11, wherein the wireless receiver listens for the signal at a rate of about ten times per second.

Example 13

A wireless server for broadcasting lighting control signals to a plurality of lighting controllers, wherein at least one of the plurality of lighting controllers is coupled to a lamp configured output a lighting pattern to affect a biological circadian rhythm, wherein the output of each of the lamps is synchronized, comprising: (a) a data repository storing correlation data for correlating local daylight information with operational information, wherein the local daylight information includes sunlight color-temperature information, and wherein operational information includes at least one of at least one of geographical position information and time of day information; (b) means for obtaining the operational information relative to the server; (c) a processor configured to (i) correlate the local daylight information with the operational information, (ii) determine a local color-temperature value representative of the local daylight information and the operational information of the server, and (iii) generate a lighting output control signal including the local color-temperature value; and (d) a radio configured to broadcast the signal within a site system, wherein any one of a plurality of lighting controllers positioned in the site system may detect the signal and adjust a lighting output of a lamp; wherein the operational information is obtained on a continuous basis for providing to the processor generating the lighting output control signal, and wherein the radio continuously broadcasts the lighting output control signal generated by the processor.

Example 14

The wireless server of Example 13, wherein the means for obtaining operational information includes one of: (a) using a GPS connection and deriving the operational information from local location information obtained from the GPS connection, (b) using a cellular connection and deriving the operational information from local location information obtained from the cellular connection, (c) using an internet connection and deriving the operational information from local location information obtained from the internet connection, or (d) receiving the operational information from a geographically remote server.

Example 15

The wireless server of any of Examples 13 or 14, wherein the radio broadcasts the signal to the site system at a rate of about ten times per second.

Example 16

The wireless server of any of Examples 13, 14, or 15, further comprising a user input device, wherein the user input device is configured to accept input from a user to override the local color temperature value of the signal.

Example 17

The wireless server of any of Examples 13, 14, 15, or 16, further comprising a plurality of lighting controllers positioned within the site system, each of the plurality of lighting controllers coupled to a lamp, each of the plurality of lighting controllers including: (i) a wireless receiver configured to continuously listen for and receive the signal broadcasted by the server, and (ii) a lighting driver operable to control a lighting pattern emitted by the lamp according to the signal.

Example 18

A method for adjusting lighting output of a plurality of lighting devices to direct an environmental lighting pattern affecting a biological circadian rhythm, the method comprising the steps of: providing a data repository storing correlation data for correlating local sunlight color-temperatures with operational information, wherein operational information includes at least one of at least one of geographical position information and time of day information; obtaining the operational information relative to the server; determining a color temperature output value by correlating the operational information with the local sunlight color-temperature; broadcasting on a continuous basis the color temperature output value to a plurality of lighting devices; receiving the color temperature output value, wherein each of the plurality of lighting devices listens for the color temperature output value on a continuous basis, and wherein each of the plurality of lighting devices listens for the color temperature output value immediately upon powering-on; and modifying the lighting output of each of the plurality of lighting devices according to the color temperature output value.

Example 19

The method of Example 18, wherein said broadcasting occurs about ten times per second.

Example 20

The method of any of Examples 18 or 19, wherein said listening occurs about ten times per second.

MISCELLANEOUS

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A wireless lighting control system for directing a lighting output of one or more lighting devices to affect a biological circadian rhythm, comprising:
   a server, including:
      means for obtaining operational information including at least one of geographical location information and time of day information relative to the server,
      a first processor configured to continuously determine local daylight information at a first rate using the operational information and to generate signals at the first rate including a color temperature value representative of the local daylight information, and
      a wireless transmitter configured to broadcast the signals at a second rate within a site system, wherein the second rate is faster than the first rate; and
   one or more lighting control devices positioned within the site system, each of the one or more lighting control devices configured to couple with at least one of the one or more lighting devices and to control a lighting output of the coupled one or more lighting devices, each of the one or more lighting control devices including:
      a wireless receiver configured to continuously listen for and receive the signals broadcasted by the server, and
      a lighting driver coupled to the wireless receiver and operable to change the lighting output of the coupled one or more lighting devices according to the detected signals;
   wherein each of the one or more lighting devices is configured to synchronously adjust the lighting output and emit a common color temperature.

2. The wireless lighting control system of claim 1, further comprising a GPS module, wherein the means for obtaining operational information includes activating the GPS module and receiving the operational information from a GPS connection.

3. The wireless lighting control system of claim 1, further comprising a cellular transceiver, wherein the means for obtaining operational information includes activating the cellular transceiver and receiving the operational information from a cellular connection.

4. The wireless lighting control system of claim 1, further comprising an internet-enabled device, wherein the means for obtaining operational information includes activating the internet-enabled device and receiving the operational information from an internet connection.

5. The wireless lighting control system of claim 1, further comprising a geographically remote server in communication with the server through a wide-area network, wherein the means for obtaining operational information includes receiving the operational information from the geographically remote server.

6. The wireless lighting control system of claim 1, wherein at least one of the one or more lighting control devices listens for the signals broadcast from the server as part of its power-up routine and controls the initial illumination of the lighting output of the coupled one or more lighting devices.

7. The wireless lighting control system of claim 6, wherein when a signal from the server is not detected as part of the power-up routine, the one or more lighting control devices outputs the lighting output of the last-received signal prior to powering-down.

8. The wireless lighting control system of claim 1, wherein the signals include a dimming control signal for adjusting a dim level of the one or more lighting devices.

9. The wireless lighting control system of claim 1, wherein the server includes a receiver, wherein at least one of the one or more lighting control devices includes a transmitter, and wherein the at least one of the one or more lighting control devices is configured to provide a return signal to the server.

10. The wireless lighting control system of claim 1, further comprising:
  a geographically remote server in communication with the server through a wide-area network, wherein the geographically remote server is remotely accessible and configurable by a user; and
  a user input device, wherein the user input device is configured to accept input from a user to override the color temperature value of the signals.

11. The wireless lighting control system of claim 1, wherein the wireless transmitter wirelessly broadcasts the signals throughout the site system at a rate of about ten times per second.

12. The wireless lighting control system of claim 1, wherein the wireless receiver listens for signals at a rate of about ten times per second.

13. A wireless server for broadcasting lighting control signals to a plurality of lighting controllers, wherein each of the plurality of lighting controllers is coupled with at least one of a plurality of lamps configured to output a lighting pattern to affect a biological circadian rhythm, wherein the output of each of the lamps is synchronized, comprising:
  a data repository storing correlation data for correlating local daylight information with operational information, wherein the local daylight information includes sunlight color-temperature information, and wherein operational information includes at least one of at least one of geographical position information and time of day information;
  means for obtaining the operational information relative to the server;
  a processor configured to continuously, at a first rate,
    correlate the local daylight information with the operational information,
    determine a local color-temperature value representative of the local daylight information and the operational information of the server, and
    generate a lighting output control signal including the local color-temperature value; and
  a radio configured to broadcast the lighting output control signal within a site system at a second rate, wherein the first rate is slower than the second rate, wherein each of the plurality of lighting controllers positioned in the site system is configured to detect the signal and adjust a lighting output of a lamp;
  wherein the operational information is obtained on a continuous basis for providing to the processor generating the lighting output control signal, and wherein the radio continuously broadcasts the lighting output control signal generated by the processor to the plurality of lighting controllers to synchronously adjust a color temperature lighting output of the plurality of lamps.

14. The wireless server of claim 13, wherein the means for obtaining operational information includes one of:
  using a GPS connection and deriving the operational information from local location information obtained from the GPS connection,
  using a cellular connection and deriving the operational information from local location information obtained from the cellular connection,
  using an internet connection and deriving the operational information from local location information obtained from the internet connection, or
  receiving the operational information from a geographically remote server.

15. The wireless server of claim 13, wherein the radio broadcasts the signal to the site system at a rate of about ten times per second.

16. The wireless server of claim 13, further comprising a user input device, wherein the user input device is configured to accept input from a user to override the local color temperature value of the signal.

17. The wireless server of claim 13, further comprising a plurality of lighting controllers positioned within the site system, each of the plurality of lighting controllers coupled with at least one of a plurality of lamps, each of the plurality of lighting controllers including:
  a wireless receiver configured to continuously listen for and receive the signal broadcasted by the server, and
  a lighting driver operable to control a lighting pattern emitted by the at least one of a plurality of lamps according to the signal.

18. A method for adjusting lighting output of a plurality of lighting devices to direct an environmental lighting pattern affecting a biological circadian rhythm, the method comprising the steps of:
  providing a data repository storing correlation data for correlating local sunlight color-temperatures with operational information, wherein operational information includes at least one of at least one of geographical position information and time of day information;
  obtaining the operational information relative to a server;
  determining, at a first rate, a color temperature output value by correlating the operational information with the local sunlight color-temperature;
  broadcasting, at a second rate, the color temperature output value and a unique server identifier to a plurality of lighting devices, wherein the first rate is slower than the second rate;
  receiving the color temperature output value and the unique server identifier, wherein each of the plurality of lighting devices listens for the color temperature output value and the unique server identifier on a continuous basis, and wherein each of the plurality of lighting devices listens for the color temperature output value and the unique server identifier immediately upon powering-on;
  correlating the unique server identifier with the server; and
  modifying the lighting output of each of the plurality of lighting devices synchronously according to the color temperature output value.

19. The method of claim 18, wherein said broadcasting occurs about ten times per second.

20. The method of claim 18, wherein said listening occurs about ten times per second.

* * * * *